Oct. 24, 1972   D. C. SCHLUDERBERG   3,700,552
NUCLEAR REACTOR WITH MEANS FOR ADJUSTING
COOLANT TEMPERATURE
Filed Nov. 19, 1969   4 Sheets-Sheet 1

INVENTOR.
Donald C. Schluderberg
BY
*J. Maguire*
ATTORNEY

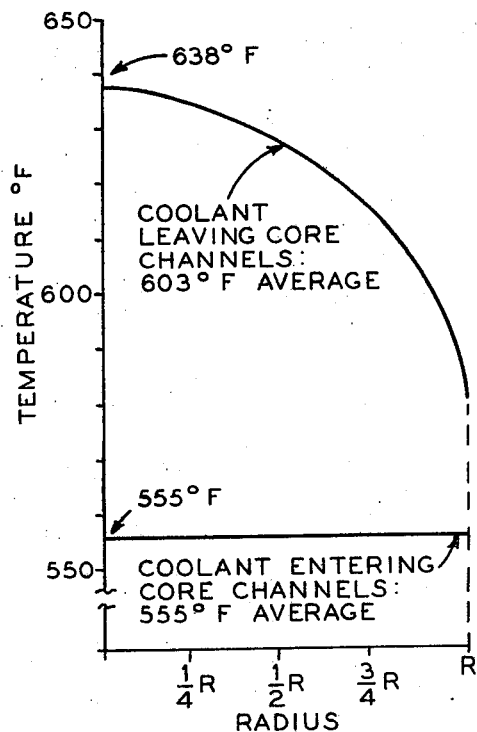
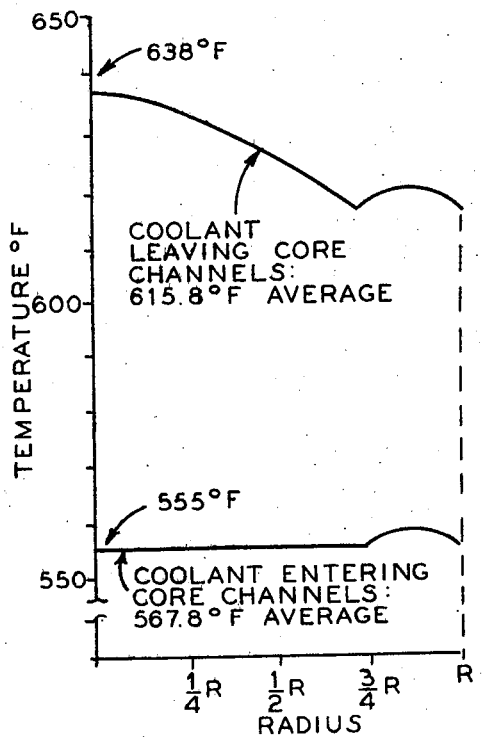
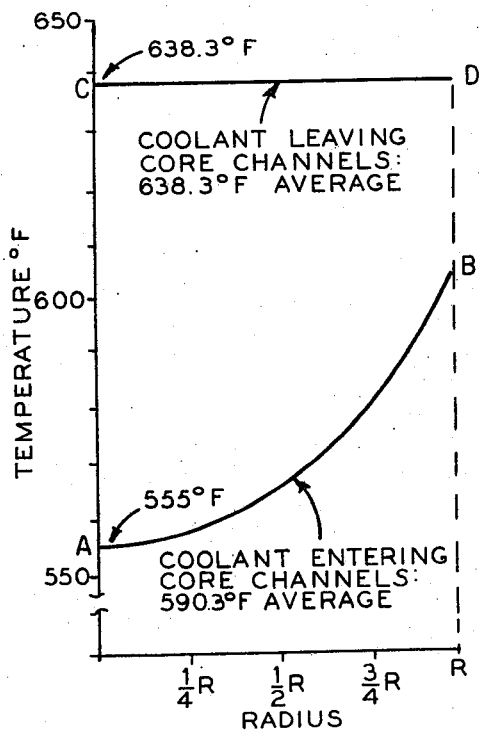

Oct. 24, 1972   D. C. SCHLUDERBERG   3,700,552
NUCLEAR REACTOR WITH MEANS FOR ADJUSTING
COOLANT TEMPERATURE
Filed Nov. 19, 1969   4 Sheets-Sheet 4

United States Patent Office

3,700,552
Patented Oct. 24, 1972

3,700,552
NUCLEAR REACTOR WITH MEANS FOR
ADJUSTING COOLANT TEMPERATURE
Donald C. Schluderberg, Lynchburg, Va., assignor to
The Babcock & Wilcox Company, New York, N.Y.
Filed Nov. 19, 1969, Ser. No. 878,125
Int. Cl. G21c 15/00
U.S. Cl. 176—50                                4 Claims

ABSTRACT OF THE DISCLOSURE

A nuclear reactor system which includes a reactor pressure vessel having a core predominately made up of fuel elements that define coolant flow passageways within the core, is connected in primary coolant flow communication with a heat exchanger and provided with apparatus for circulating primary coolant around the exchanger for mixing with coolant returning from the heat exchanger to adjust the temperature of the coolant entering some of the fuel element passageways, thereby adjusting the average temperature of the coolant leaving the core.

BACKGROUND AND SUMMARY OF THE INVENTION

In Pressurized Water Reactors (PWR's, it is desirable to maximize the average outlet temperature of the coolant leaving the core to increase the efficiency or reduce the cost of a nuclear plant. For example, with higher average temperature it is possible to reduce the size and cost of the steam generators driven by the reactor, improve steam turbine throttle conditions, reduce the primary system flow rate, and reduce the primary system pumping power requirements. The average outlet temperature may be maximized by obtaining a more uniform power distribution throughout the core and/or adjusting the mass flow rate of coolant passing through the elements.

The "mass-flow-rate" method of adjusting the fuel element outlet temperatures of a core is generally used in cores made up of canned fuel elements. The sheathing of the individual elements is relied upon to contain the pressure differentials developed between adjacent fuel elements as a result of maintaining a different rate of coolant flow in each of them. The state of the art PWR cores are made up of canless fuel elements or utilize cans of insufficient strength to contain the pressure differentials associated with the mass-flow-rate method of adjusting the core outlet temperature. Thus the mass-flow-rate method has not been utilized in PWR's.

This invention generally provides a method of adjusting the temperature of the coolant leaving the fuel elements of canless cores. The invention achieves results which are comparable to those obtained when utilizing the mass-flow-rate method in canned cores, and more particularly provides a method of achieving these results in PWR cores. It is a method of operating a reactor in which coolant flowing out of the core is proportionally mixed with coolant returning from the heat exchanger, to selectively adjust the temperature of the coolant entering the individual fuel elements so that the outlet temperature across the core is rendered more uniform. In this manner, the temperature of the coolant flowing out of the core can be rendered substantially uniform radially of the axis of the core, although the core is of canless construction. In a preferred embodiment, the average enthalpy of the core outflow is increased to the point where the coolant is partially vaporized.

BRIEF DESCRIPTION OF THE DRAWINGS

FIG. 4 is an idealized plot of the temperature of primary coolant entering and leaving the core of a pressurized water reactor as a function of its radial displacement from the axial centerline of the core.

FIG. 5 is the plot of FIG. 4, as altered due to an increase in the temperature of primary coolant entering fuel elements near the periphery of the core.

FIG. 6 is the plot of FIG. 4, as altered due to an increase in the temperature of primary coolant entering the fuel elements to equalize the temperature of the coolant leaving all the fuel elements of the core.

DESCRIPTION OF THE PREFERRED EMBODIMENTS

Figure 1:
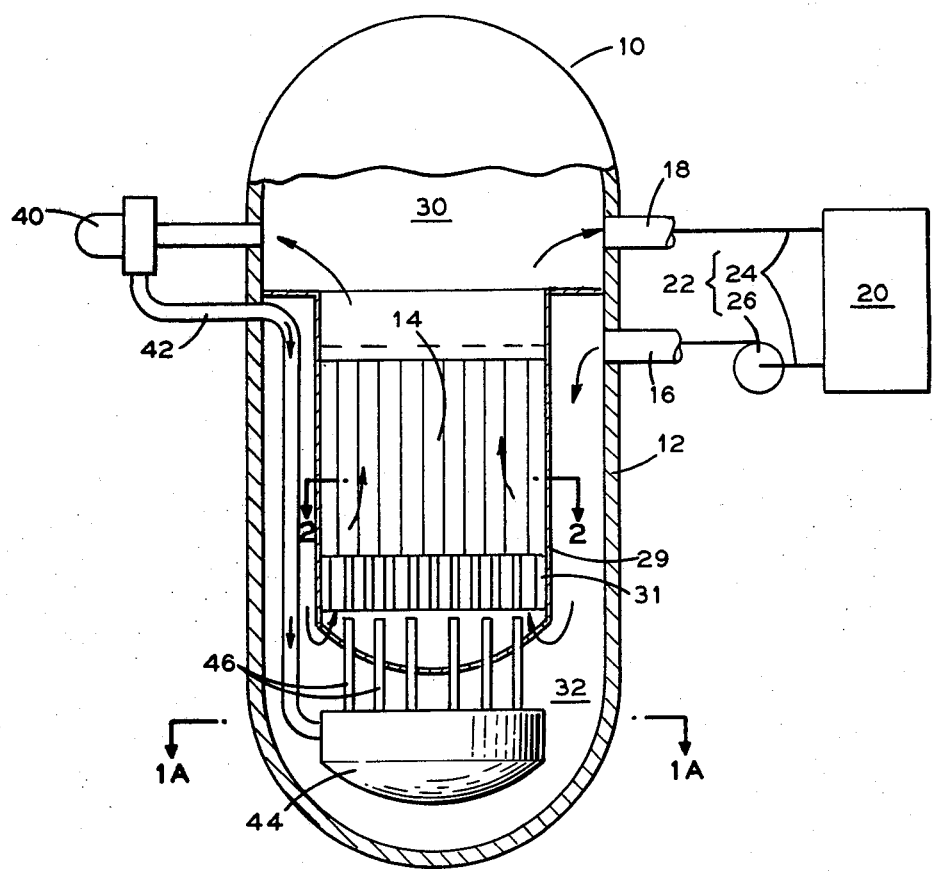
FIG. 1 is a pictorial, partially sectioned, vertical elevation of a nuclear reactor complex embodying the invention.

Referring now to the drawings wherein like reference numerals designate like or corresponding parts throughout the several views, there is shown in FIG. 1, a generalized fluid cooled nuclear reactor complex 10, which basically comprises a pressure vessel 12 that encloses a reactive core 14 located approximately centrally of the vessel and in the path of primary coolant flow from the vessel's inlet 16 to its outlet 18. Means 22, including conduits 24 and a pump 26, are provided for continuously circulating the coolant in a closed loop through the vessel and exchanger, the coolant being pumped around the loop to absorb heat as it passes through the core and give it up as it passes through the heat exchanger 20.

The reactor system of FIG. 1 is intended to be representative of any fluid cooled reactor complex to which inventive method of operating reactors has application. At this writing it is believed to have generic application to reactors utilizing either water, steam, a liquid metal, liquid salt or gas coolant, or the like as a primary coolant. In addition, the inventive method is adaptable to a pressurized water reactor system wherein a steam generating reactor with a closed primary coolant loop feeds an exchanger in which the steam phase is condensed and the resultant fluid cooled as in a pressurized water reactor system. For a boiling water reactor system (BWR) the heat exchanger 20 of FIG. 1 may thus be considered to represent a condenser and a turbine, whereas for a pressurized water reactor system (PWR) the exchanger 20 may be considered to be representative of a heat exchanger complex which includes an indirect heat exchanger through which the primary coolant passes to give up its heat to a secondary coolant that is in turn circulated through a turbine. In the case of a BWR, steam separating means well known in the art would be located in the upper plenum 30 to provide steam for line 18 and water for recirculation through pump 40 and line 42.

For simplicity of presentation, the inventive method will hereinafter be described in connection with the operation of a pressurized water reactor complex (PWR).

In such a reactor, the core 14 is typically contained in a shroud 29 and supported by a lower grid plate 31, and includes appropriate means for supporting its fissionable nuclear fuel intermingled with control rods. As shown in FIG. 1, the core is located within the vessel between its upper and lower ends so to define upper and lower plenums 30 and 32, respectively situated above and below the core.

Figure 2:
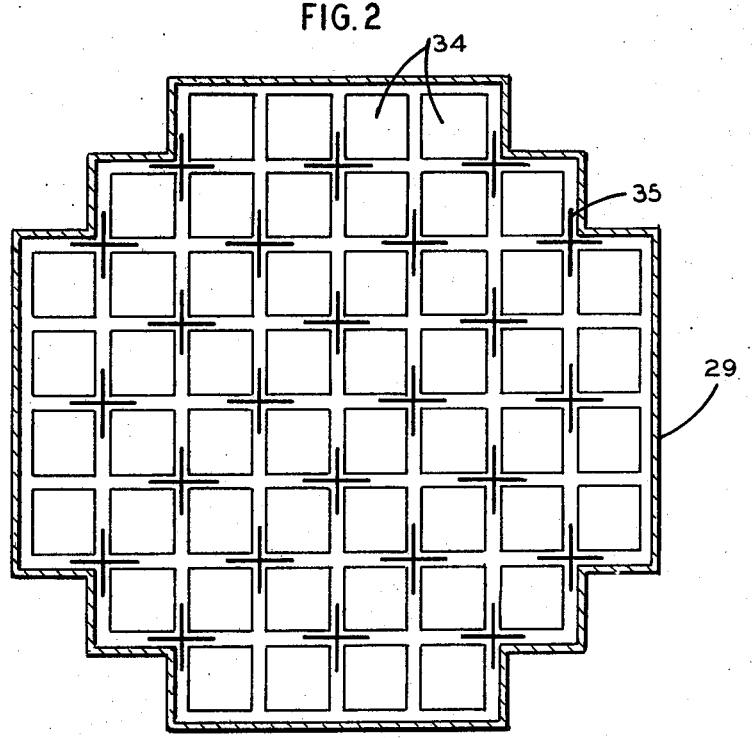
FIG. 2 is a sectional view of the core of FIG. 1, taken substantially along the line 2—2 of FIG. 1.
Figure 3:
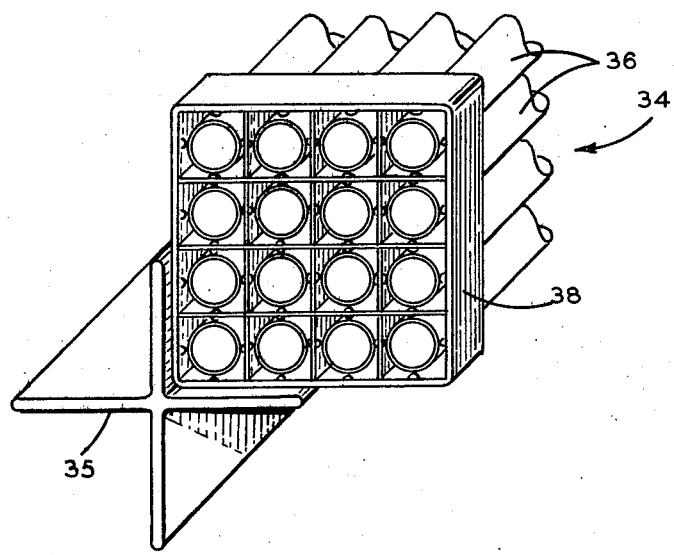
FIG. 3 is a pictorial three dimensional view of one of the fuel elements and control rods of the core of FIG. 2.

As shown in FIGS. 2 and 3 the fuel supporting portion of the core generally comprises a large number of fuel elements 34; each of which is made up of a plurality of elongated, cylindrically-shaped, spaced parallel, fuel rods 36. The rods are clad with a suitable material and held apart from one another by a plurality of grid members, such as members 38 shown in FIG. 3. In practice, a sufficient number of grid members are distributed along the longitudinal length of an element to bundle its rods together so as to rigidly maintain the spacing between the rods. Primary coolant from the lower plenum flows in heat exchange relationship with rods as it passes upwardly to the upper plenum. The rods of a given fuel element are each surrounded by a coolant flow channel whose boundaries are determined by the next adjacent rods. The overlapped channels are in coolant flow communication with one another. Thus rods of a given fuel element describe an elongated coolant flow passageway of lattice-like cross-section through which the coolant flows endwise of the element. Although the coolant flow passageways of adjacent fuel elements are in coolant flow communication with one another, they will hereinafter be referred to as if they were isolated from one another. The lateral extent of a given fuel element passageway is defined by an imaginary open-ended conduit of sheating which encloses all the rods of that fuel element. Since the fuel elements of some prior art reactors are actually enclosed in such sheating they are known in the art as "canned" fuel elements. As a consequence the elements herein described have come to be known in the art as "canless" fuel elements. Both types of cores may thus be described as being made up of a plurality of upright fuel elements oriented substantially parallel with one another to define a plurality of substantially parallel core coolant passageways.

As best shown in FIG. 3, the elements of the core may be interspersed with control rods 35 for adjusting the power output of the core. The control rods are made of a material that absorbs neutrons. In some cores the control rods are of circular cross-section and housed in tubes which take the place of one or more of the fuel rods of a plurality of fuel elements. In either case, the control rods are endwise movable in and out of the core.

Most PWR cores are of generally circular cross-section as shown in FIG. 2. Assuming a uniform distribution of fuel within the elements of the core, a fixed rate of flow of coolant through all of the core channels and the temperature of the coolant entering the core to be a constant; the temperature of the coolant leaving the core gradually decreases radially of its center because the neutron flux and power level do so. The fuel elements centrally of the core tend to develop more power than those at its periphery. Under the assumed conditions in a typical PWR, when the inlet temperature of coolant entering the core is held constant at 555° F., the temperature of the coolant flowing out of the core falls off radially of its center as shown in FIG. 4, so that the average temperature across the core outlet is approximately 603° F. The temperature of the coolant flowing out of a given fuel element is thus generally related to the neutron flux and power generation levels of the fuel element.

As hereinbefore indicated, it is desirable to maximize the average outlet temperature of the coolant leaving the core to increase the efficiency or reduce the cost of a nuclear plant. The average outlet temperature of the core may be maximized by obtaining a more uniform distribution of power throughout the core and/or by adjusting the mass flow rate of coolant passing through the individual fuel element passageways. The mass-flow-rate method of adjusting the outlet temperature profile of a core, e.g., the outlet temperature radially of the center of a core, is employed in cores made up of canned fuel elements. Since this invention provides a method of achieving substantially the same results in uncanned cores, and generally comprises adjusting the core inlet temperature radially of the center of the core by utilizing a recirculation scheme, it will hereinafter be referred to as Recirculation Temperature Profiling (RTP). The method generally includes proportionally mixing coolant returning from the heat exchanger with coolant flowing out of the core, and directing the mixed coolant through some of the fuel element passageways to selectively adjust the outlet temperature of those fuel elements to thereby adjust the temperature of the coolant flowing out the core radially of its center. Thus the outlet temperature profile of the core is adjusted by adjusting its inlet temperature profile. The average enthalpy of the coolant flowing out of the core is preferably increased to the point where the coolant is partially vaporized. The method is equally applicable to cores made up of canned or canless fuel elements. As a consequence, in canned fuel element cores, the mass-flow-rate and RTP methods may be used in conjunction with one another.

Figure 1A:
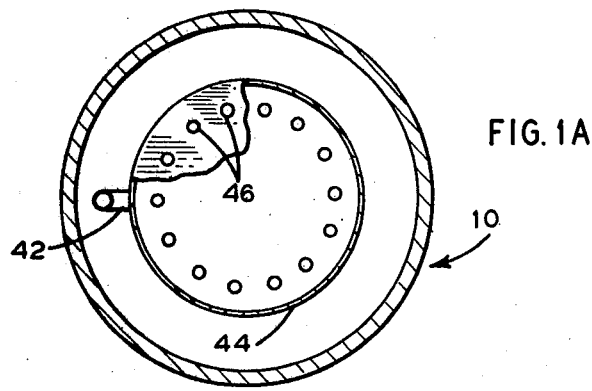
FIG. 1A is a sectional view of the recirculating coolant header of FIG. 1, taken substantially along the line 1A—1A of FIG. 1.

To implement the RTP method, means are provided for directly circulating a portion of the core outflow from the reactor's upper plenum to lower plenum, where it is collected, and directed to the outer radial region of the core and into its colder fuel element passageways. As shown in FIGS. 1 and 1A, in one embodiment of the invention, a pump 40, having its suction side connected in coolant flow communication with the upper plenum 30 of the reactor, is arranged to discharge some of the core outflow coolant through conduit 42, which is connected to tank 44 mounted within the lower plenum 32 of the reactor. Tank 44 is a recirculating coolant header. Flow tubes 46, connected to tank 44, direct the core outflow coolant towards the colder fuel element passageways, e.g., those nearest the outer periphery of the core. The hot recirculated coolant thus mixes with the colder coolant returning from the heat exchanger as it flows into the core, to increase the temperature of coolant entering the colder channels of the core. If $25 \times 10^6$ lbs./hr. of the total core outflow of $148 \times 10^6$ lbs./hr. of coolant is injected below the outer radial region of the core, as shown in FIG. 5, the average temperature of coolant entering the fuel element passageways at the periphery of the core is increased 12.8° F., to approximately 567.8° F., thereby increasing the average temperature of core outflow coolant to approximately 615.8° F. The 12.8° rise in core outflow temperature is sufficient to permit increasing the operating pressure on the secondary side of the heat exchanger from 910 p.s.i.a. to 1010 p.s.i.a., or 100 p.s.i.a. These figures presume the Log Means Temperature Difference in the heat exchanger 20 is maintained the same as it was prior to injecting core outflow coolant into the core.

The tubes of FIG. 1 are arranged in a substantially circular array beneath the reactor core, as shown in FIG. 1A, and located at a distance of approximately ⅞r from the axis of the core. Other tubes 46, extending from the tank towards the grid plate 31, may be arranged in other circular arrays at other distances from the axis of the core as shown in FIG. 7A, without departing from the spirit and scope of the invention. To control the volume of flow through these tubes at various points below the grid plate, fixed orifices of different sizes may be provided at the end of each of the tubes without departing from the spirit and scope of the invention. Thus the volume of core outflow passing through a given circular array of tubes 46, spaced a lesser distance from the axis of the core, could be easily controlled to be less than the volume of core outflow passing through the array of tubes 46 shown in FIG. 1A, in order to more nearly approach the ideal condition portrayed in FIG. 6.

Calculations have shown that the regulated introduction of $86.4 \times 10^6$ lbs./hr. of a total core outflow of $202 \times 10^6$ lbs./hr. of coolant must be injected below the core via plural circular arrays of tubes 46 provided with fixed orifices, sized to control the volume of coolant passing through a given tube 46, to increase the average core inflow temperature to approximately 590.3° F., with the result that the operating pressure on the secondary side of the heat exchanger can be increased from 910 p.s.i.a. to 1210 p.s.i.a., or 300 p.s.i.

Figure 7:
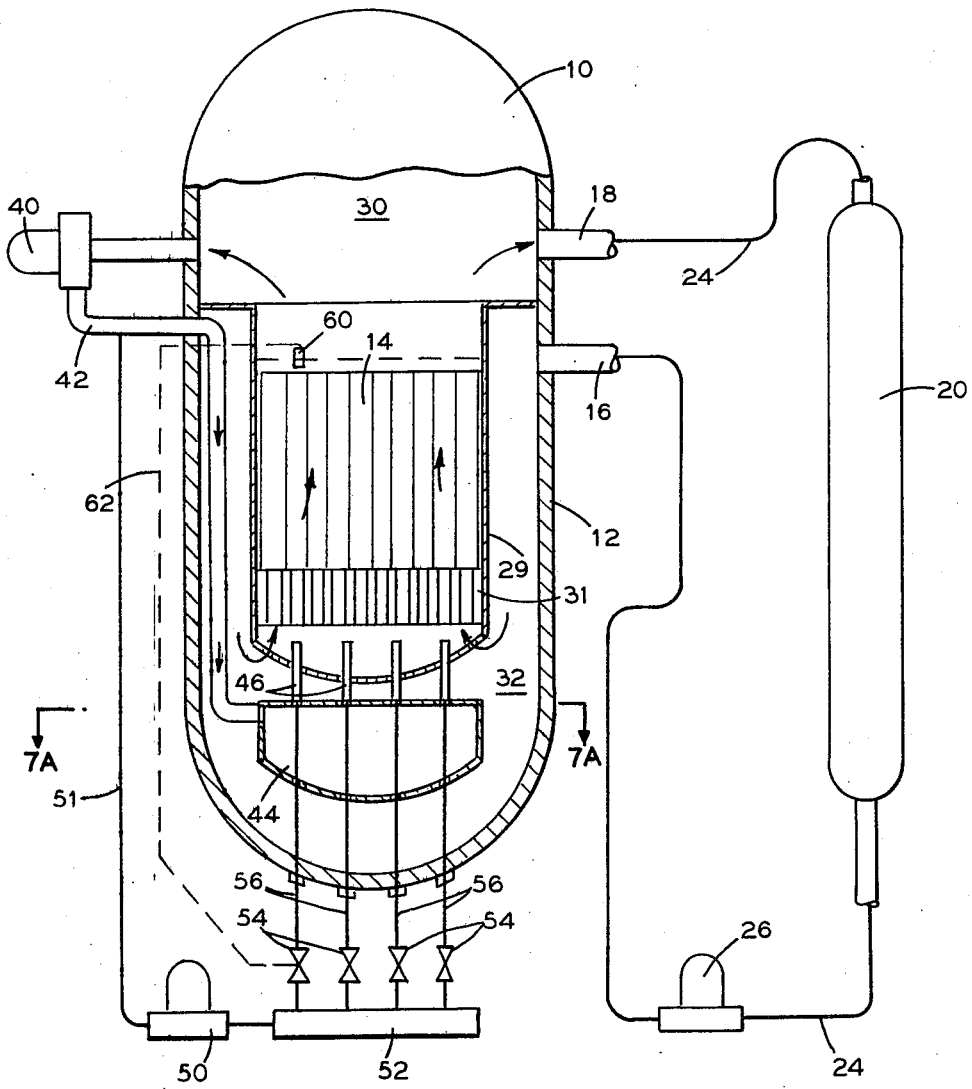
FIG. 7 is the reactor complex of FIG. 1, with a modified version of the embodiment of the invention shown in FIG. 1.
Figure 7A:
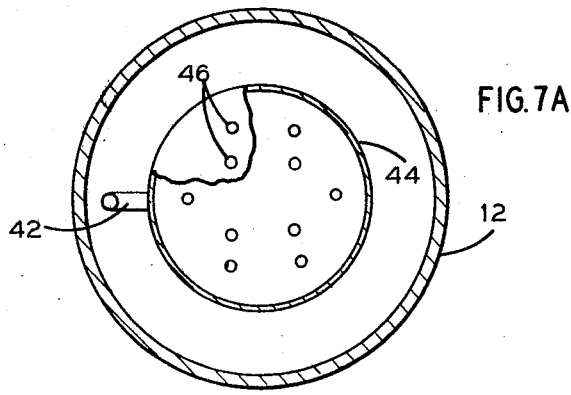
FIG. 7A is a sectional view taken along line 7A—7A of FIG. 7.

To more readily compensate for slight differences in coolant temperatures in the outlets of adjacent fuel element passageways, and to compensate for changes in these temperatures with time as fuel is depleted from the fuel elements, the RTP system of FIG. 1 may be modified with hydraulic control apparatus as shown in FIG. 7.

FIG. 7 differs from FIG. 1 in that a secondary pump 50, having its suction side connected to line 42, via line 51 is arranged to discharge some of the hot coolant taken from the upper plenum of the reactor, into a second recirculating coolant header 52, located externally of the reactor, from which controlled amounts of coolant are directed to the individual flow tubes 46 to selectively change the ratio of hot to cold coolant flowing into a given fuel element passageway. In effect, the supplementary hydraulic control apparatus provides vernier control of the inlet temperature profile, to compensate for changes in the power level of the individual fuel elements.

Valve 54 is provided to regulate the flow of coolant from the externally located coolant recirculating header 52, to the internaly located header 44, via line 56. It is understood, of course, that the hydraulic control apparatus could be replaced by its mechanical counterpart or any other system which accomplishes the result of varying the mixture of hot to cold coolant entering the fuel element passageways, without departing from the spirit and scope of the invention.

To monitor the temperature of the coolant leaving the individual fuel element passageways, a thermocouple 60 is preferably associated with each of the passageway outlets. One of such thermocouples with its signal line extending therefrom is shown in FIG. 7. Signal lines 62 extending from the individual thermocouples and externally of the reactor may be connected to any well known visual temperature display device (not shown), in which case the control valves 54 associated with the fuel element passageways whose coolant outlet temperatures were measured could be manually operated, as necessary, in response to the displayed signal. Alternatively, the signal line from a given passageway outlet could be connected either directly or indirectly to the control valve 54 corresponding to the same passageway, for automatically operating the valve, in which case the control valve could be any well known valve which is automatically operated in response to a given thermocouple signal level or one derived therefrom by means well known in the the art.

In a PWR system having a closed primary coolant loop, the average enthalpy of the primary coolant leaving the core may be considerably increased by generating steam in the core. In such a reactor it may be desirable to separate the steam and water at the core outlet or in the upper plenum and only recirculate the steam to the inlet side of the core to achieve the benefits of the RTP method of core outlet temperature profiling. It is within the scope of the invention to apply the RTP method in this manner, utilizing steam separation and pumping apparatus well known in the art to accomplish the desired result.

In this embodiment, it is desirable to monitor the temperature of the mixture of coolant as it enters the fuel element passageways, and adjust its ratio of hot to cold coolant in response to the difference between the measured temperature and a predetermined level. With a knowledge of the rate of flow of coolant through the core and information obtained through the use of in-core power instrumentation well known in the art, the desired fuel element inlet temperatures may be established to achieve the desired core outlet conditions.

It should be noted that a problem of long standing in the PWR reactor art is solved by the application of the RTP method disclosed herein.

In prior art, PWR reactors there is an inherent tendency for the mass flow rate of coolant in the hotter core passageways to be less than it is in the colder passageways due to steam voids developing in the hotter passageways but not developing in the colder ones. When the RTP method is applied, the temperature of the coolant across the core becomes more uniform, causing the mass flow rate of coolant through the passageways to also become more uniform.

What is claimed is:

1. In an improved nuclear reactor system provided with a pressure vessel having a core of longitudinal fuel elements in a horizontal array defining a plurality of longitudinal passageways for the flow of primary coolant through said core, each of said passageways having an inlet and outlet, a heat exchanger in primary coolant flow communication with said inlet and outlet of said passageways, means for circulating primary coolant through a conduit circuit through said heat exchanger and said vessel via said passageways, the improvement consisting essentially of a second conduit circuit for heated coolant leading from said outlet to said inlet of said passageways of said core, said second circuit having circulating means for said heated coolant at said inlets, whereby said heated coolant from said second circuit is mixed in increasing proportion with coolant having a lower temperature coming from said heat exchanger as the distance increases radially from the center of the core, and such mixture is selectively distributed to said passageways to generate an average inlet coolant profile of gradually increasing temperature radially from the center of the core for the subsequent control of the average temperature profile of said coolant at the outlet of said passageways, the latter profile being substantially constant at a constant power flux of said core.

2. The system of claim 1 wherein the average inlet coolant profile is shown by line AB of FIG. 6 and the average outlet temperature profile is shown by line CD of the same figure.

3. In an improved method of operating a nuclear reactor provided with a pressure vessel having a core of longitudinal fuel elements in a horizontal array defining a plurality of longitudinal passageways for the flow of primary coolant through said core, each of said passageways having an inlet and outlet, a heat exchanger in primary coolant flow communication with said inlet and outlet of said passageways, means for circulating primary coolant through a conduit circuit through said heat exchanger and said vessel via said passageways, the improvement of providing a constant flow at said inlets of coolant having increasing temperature as the distance increases radially from the center of the core, thereby providing an average inlet coolant profile of gradually increasing temperature radially from the center of the core for the subsequent control of the average temperature profile of said coolant at the outlets of said passageways, the latter profile being substantially constant with constant power flux of said core.

4. The method of claim 3 wherein the average inlet coolant profile is shown by line AB of FIG. 6 and the average outlet temperature profile is shown by line CD of the same figure.

References Cited

UNITED STATES PATENTS

| | | | |
|---|---|---|---|
| 2,989,453 | 6/1961 | Esselman et al. | 176—20 |
| 3,087,881 | 4/1963 | Treshow | 176—61 |
| 3,202,584 | 8/1965 | Bogaardt et al. | 176—61 |
| 3,212,975 | 10/1965 | Fletcher et al. | 176—61 |
| 3,180,803 | 4/1965 | Gibbons | 176—20 |
| 3,446,704 | 5/1969 | Hannerz et al. | 176—61 |

REUBEN EPSTEIN, Primary Examiner

U.S. Cl. X.R.

176—20, 65